Feb. 11, 1930.                J. M. ANDERSEN                1,746,234
CIRCUIT CONTROLLING APPARATUS
Filed June 2, 1927          2 Sheets-Sheet 2
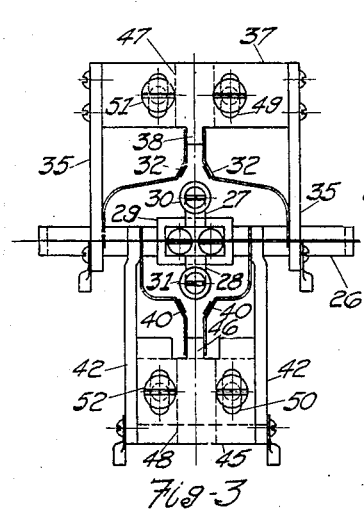
Fig-3
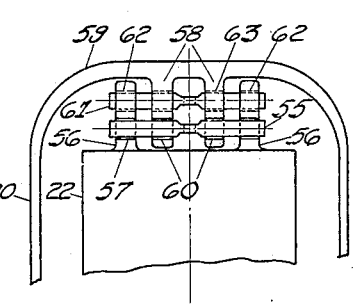
Fig-4
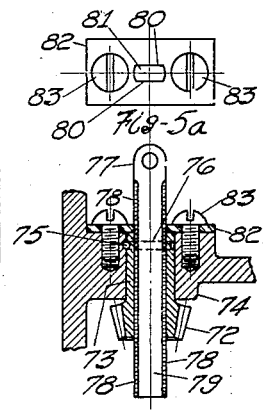
Fig-5a
Fig-5
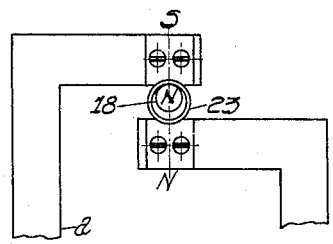
Fig-6  Fig-7
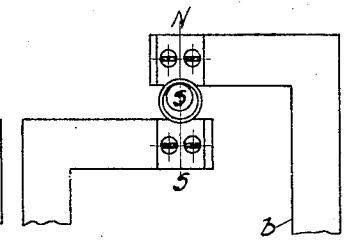
Fig-8  Fig-9
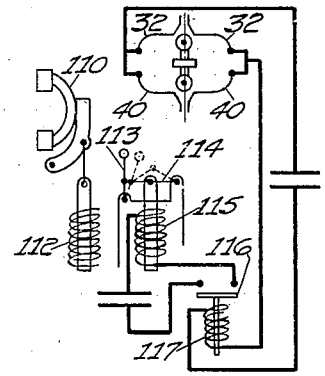
Fig-12
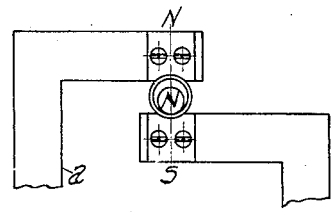
Fig-10  Fig-11
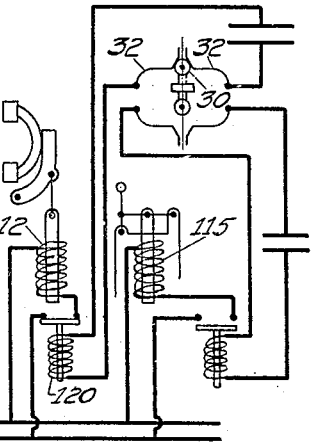
Fig-13
Inventor:
Johan M. Andersen
by Jas. H. Churchill
atty Patented Feb. 11, 1930

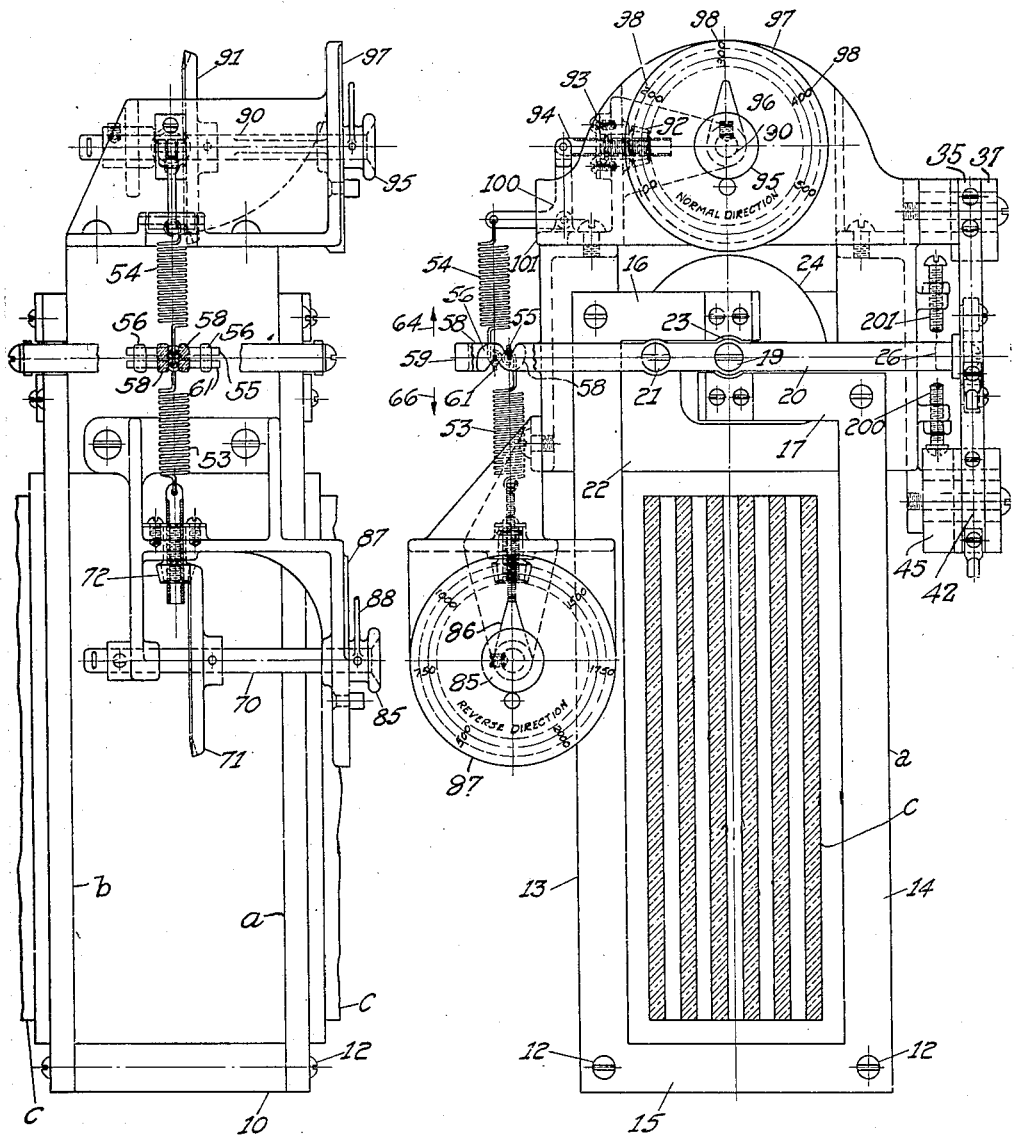

1,746,234

UNITED STATES PATENT OFFICE

JOHAN M. ANDERSEN, OF BROOKLINE, MASSACHUSETTS, ASSIGNOR TO ALBERT & J. M. ANDERSON MANUFACTURING COMPANY, OF BOSTON, MASSACHUSETTS, A CORPORATION OF MASSACHUSETTS

CIRCUIT-CONTROLLING APPARATUS

Application filed June 2, 1927. Serial No. 196,119.

This invention relates to an electric circuit controlling apparatus, and has for one of its objects to provide an apparatus for controlling a plurality of auxiliary circuits in response to currents flowing in opposite directions through a main circuit.

The invention has for another object to provide a circuit controlling apparatus of this character which is capable of being adjusted by the user to respond to different current values, as will be described.

The invention further has for its object to provide a simple and efficient apparatus of the character described, which is especially designed to be non-responsive to a normal current flowing in one direction through the main circuit and to be responsive to abnormal currents flowing in opposite directions through the main circuit as will be described.

For convenience, the electric circuit controlling apparatus will be hereinafter referred to as a relay.

These and other features of this invention will be pointed out in the claims at the end of this specification.

Fig. 1 represents in front elevation a relay embodying this invention, and in section a bus bar upon which the relay is mounted;

Fig. 2, a side elevation of the relay shown in Fig. 1, looking toward the right;

Fig. 3, a detail in elevation of a portion of the relay shown in Fig. 1, looking toward the left;

Fig. 4, a detail in plan of a portion of the movable armature carrier;

Fig. 5, a detail in section of a portion of the adjusting device;

Fig. 5ª, a plan of the plate shown in Fig. 5;

Figs. 6 to 11, inclusive, diagrammatic views of portions of the relay to illustrate the operation of the same;

Figs. 12 and 13, diagrams of circuits illustrating the operation of the relay.

In the present instance, the invention is shown as embodied in a relay of the same general construction as that shown in United States Patent No. 1,294,411 dated February 18, 1919, and is provided with magnetizable members $a, b$ mounted upon a bus bar $c$ forming part of a main circuit.

The members $a, b$ are spaced apart and connected at their corners by steel rods or bars 10 and screws 12, and each member is substantially oblong in form and provided with side bars 13, 14 of unequal length connected at one end by a cross bar 15 and having at their other ends bars or arms 16, 17 extended toward each other in different planes with their ends overlapping and spaced apart, said ends forming poles for the magnetizable member.

Between the poles of the magnetizable members $a, b$ is located an armature comprising a soft iron core 18, which has its ends extended beyond the magnetizable members $a, b$ and secured as by screws 19 to an open frame or carrier 20, which is pivoted at 21 to a stationary frame 22 located between and secured to the magnetizable members $a, b$.

The armature or soft iron core 18 is extended through a sleeve 23 of brass or other non-magnetic material which is extended through a coil of wire not shown but which is enclosed in a casing 24 of insulating material, said coil and casing being supported by the sleeve 23 whose ends rest upon the lower pole pieces of the members $a, b$.

The non-magnetic sleeve 23 is of larger diameter than the core 18 so that the latter is capable of being bodily moved therein toward and from the upper and lower poles of the members $a, b$ as represented in Figs. 10 and 11.

The soft iron core 18 is continuously magnetized by the coil in the casing 24, which coil is connected in circuit with a source of direct current.

For a more detailed description of the apparatus as thus far described, reference may be had to the patent above referred to.

In accordance with the present invention, the movable frame 20 which carries the armature or core 18, has secured to one side or end 26 a movable member of a plurality of auxiliary circuit controllers.

The movable member herein shown see Fig. 3 consists of metal arms 27, 28 extended in opposite directions from a metal plate 29, and carrying disks or rolls 30, 31 of carbon or like good conducting material.

The disk 30 co-operates as shown with two spring terminal members 32 of an auxiliary circuit.

The spring terminal members 32 are fastened at one end to metal bars 35 secured to the opposite ends of a cross bar 37 of insulating material provided with a lug or projection 38 against which the free ends of the terminal spring members 32 normally bear.

The disk 31 co-operates with terminal spring members 40 of another circuit controller and located below the movable frame 20 and secured at their upper ends to metal bars 42, which are secured to the opposite ends of a cross bar 45 of insulating material.

The cross bar 45 is provided with a projection or lug 46 against which the free ends of the terminal spring members 40 bear (see Fig. 3).

The cross bars 37, 45 are adjustably secured to supporting members 47, 48 which are stationary, being secured to the stationary member 22 to which the armature carrier 20 is pivoted.

The cross bars 37, 45 are provided, as shown, with slots 49, 50 through which are extended screws 51, 52.

The carrier 20 for the armature or core 18 in the relay herein shown is designed to be positioned with relation to the poles of the magnetizable members under normal conditions of use, so as to occupy what may be considered a neutral position, that is, one in which the armature or core 18 is central with relation to the poles of the magnetizable members, as represented in Figs. 10 and 11, and in which the movable members 30, 31 of the auxiliary circuit controllers are in a neutral position with relation to their co-operating circuit terminals 32, 40 and out of contact therewith, as represented in Fig. 3.

The armature carrier 20 is thus positioned by means of two opposing springs 53, 54 preferably located above and below said carrier, and which may be designated the upper and lower springs.

The upper end of the lower spring 53 is connected with a rod 55 see Fig. 4, which is located above the stationary arms 56 attached to the stationary frame 22 and provided with notches or recesses 57 in their upper surfaces, in which the rod 55 is normally held by the spring 53.

The rod 55 is designed to be lifted out of the recesses or notches by arms 58 extended from the end 59 of the movable carrier or frame 20, said arms being extended between the stationary arms 56 and provided with recesses 60 for engaging the lower half of the rod 55.

The lower end of the upper spring 54 is connected with a second rod 61, which may be termed the lower rod, and which is normally held up against the underside of the stationary arms 56 and in recesses or notches 62 therein.

The rod 61 is moved downward out of engagement with the stationary arms 56 by the movable arms 58 which extend over the lower rod and are provided with recesses or notches 63 for engaging the upper half of the lower rod 61.

From the above description, it will be seen that when the end 59 of the armature carrier 20 is moved upwardly in the direction of the arrow 64, Fig. 1, the upper rod 55 is lifted by the movable arms 58 against the tension of the lower spring 53, and that the lower rod 61 is not moved but is held by the upper spring 54 against the under side of the stationary arms 56.

When, however, the end 59 of the armature carrier 20 is moved downward in the direction indicated by the arrow 66, Fig. 1, the lower rod 61 is moved downward by the movable arms 58 against the tension of the upper spring 54, and the upper rod 55 is not moved but is held by the lower spring 53 in engagement with the upper surface of the stationary arms 56.

Provision is made for adjusting the tension of the springs 53, 54, and in the present instance a preferred construction or arrangement for this purpose is provided.

The adjusting mechanism for the lower spring 53 consists of a rotatable shaft 70 having fast thereon a beveled gear 71 which meshes with a bevel pinion 72 (see Figs. 2 and 5), which is provided with an elongated hub 73 mounted to turn in a stationary bearing 74 and retained in place by a pin 75 which is extended into an annular groove 76 on the outside of the said hub.

The hub 73 is internally threaded to engage a rod 77 with which the lower end of the lower spring 53 is engaged.

The rod 77 is provided with threaded opposite circular sides or portions 78, and with opposing unthreaded substantially flat sides or portions 79, which co-operate with the straight sides 80 of an elongated slot 81 in a guide plate 82, secured by screws 83 to bearing 74 for the hub 73 (see Figs. 5 and 5a).

The rod 77 is thus held from rotating while capable of being moved longitudinally, so that by rotating the shaft 70, the beveled gear 71 rotates the beveled pinion 72, and the internally threaded hub 73 effects longitudinal movement of the roll 77, which increases or diminishes the tension of the lower spring 53 according to which way the shaft 70 is turned.

The shaft 70 is provided with a thumb piece or handle 85 carrying a pointer 86, which co-operates with a dial 87 provided with graduations indicative of the strength of current at which the relay should respond, to close the auxiliary circuit represented by the movable contact member 31 and the terminal spring members 40.

The adjusting mechanism for the upper spring 54 is of like construction and comprises a rotatable shaft 90, bevel gear 91, bevel pinion 92, guide plate 93, longitudinal movable rod 94, thumb piece 95, pointer 96, and dial 97 provided with graduations 98.

For convenience and simplification in construction, the adjusting mechanism for the upper spring 51 is located above the magnetizable members $a$, $b$ and substantially central with relation to the relay, and its longitudinally movable rod 94 is connected with the upper end of the upper spring 54 by a bell-crank lever 100 pivoted to the stationary frame 101 which supports the adjusting mechanism.

This arrangement enables the adjusting mechanism for the upper spring 54 to be arranged with its rod 94 movable horizontally and yet have the upper spring 54 movable vertically in the same direction as the lower spring.

It will be observed that the lower spring 53 is elongated by movement of the end 59 of the armature carrier 20 in the direction of the arrow 64, Fig. 1, and that this movement is effected by movement of the armature 18 toward the lower poles of the magnetizable members $a$, $b$.

It will also be observed that the movement of the armature 18 toward the lower poles of the members $a$, $b$ has no effect on the upper spring 54.

It will further be observed that the upper spring 54 is elongated by movement of the end 59 of the armature carrier 20 in the direction of the arrow 66, which is effected by movement of the armature 18 toward the upper poles of the magnetizable members $a$, $b$, and that such movement of the armature 18 has no effect upon the lower spring 53.

It will thus be seen that the lower spring 53 resists movement of the armature 18 toward the lower poles of the magnetizable members, and the upper spring 54 resists movement of the armature 18 toward the upper poles of said members, and as these movements of the armature 18 in opposite directions are effected by currents flowing in opposite directions through the circuit represented by the bus bar $c$, which circuit will be hereinafter referred to as the main circuit, the relay herein shown is capable of being used to be non-responsive to a current of normal strength flowing in the main circuit in one direction, which current may be termed the normal current; to be responsive to a current flowing in the opposite direction; which current may be termed a reverse current; and to be responsive to an abnormal or overload current flowing in the normal direction.

When a current of normal strength is flowing through the main circuit in the normal direction, the armature 18 is in its central position with relation to the poles of the members $a$, $b$ of the relay, as represented in Figs. 1, 10 and 11.

Under these conditions, the armature 18 is in what may be termed its neutral position midway between the poles of the members $a$, $b$, as represented diagrammatically in Figs. 10 and 11, and the upper poles of the members $a$, $b$ are of south and north polarity, respectively, while the lower poles of said members are of north and south polarity, as marked in Figs. 10 and 11.

If now a reverse current should flow through the main circuit, the polarity of the poles would be reversed, as represented in Figs. 8 and 9, and when the reverse current has been built up to a value sufficient to overcome the resistance offered by the lower spring 53, the armature 18 will be bodily moved toward the lower poles, as represented in Figs. 8 and 9.

This bodily movement of the armature 18 turns the carrier 20 on its pivots 21 and moves the end 59 of the latter upwardly in the direction of the arrow 64, thereby moving the contact member 31 into contact with the spring terminals 40 and closing the auxiliary circuit in which said terminals are included.

If the current flowing in the normal direction should build up to a value beyond that strength at which the armature is in its neutral position, then the strength of the normal poles, represented in Figs. 10 and 11, is increased sufficiently to overcome the opposition of the spring 54 and bodily move the armature toward the upper poles and into the position represented in Figs. 6 and 7, thereby moving the end 59 of the carrier 20 in the direction of the arrow 66, Fig. 1, and engaging the contact member 30 with the spring terminals 32 to close the auxiliary circuit in which said terminals are included.

The dial 87 of the adjusting device for the lower spring 53 is provided with graduations or members, which range in the present instance from 500 to 2000, which represent different values of the reverse current.

The pointer 88 can be turned by the user of the apparatus so as to register with a selected graduation, and thereby adjust the tension of the lower spring 53 so as to enable the auxiliary circuit to be closed, when the reverse current has reached the selected value, which in the present instance is represented in Fig. 1 as 1250 amperes.

The dial 97 of the adjusting device for the upper spring 54 is provided with graduations 98, which in the present instance range from 100 to 500, and the pointer 96 registers with the graduation 300, which represents the strength of the abnormal or overload current flowing in the normal direction in the main circuit, at which the opposition of the upper spring 54 will be overcome and the armature 18 moved into the position shown in Figs. 6 and 7, and the auxiliary circuit which includes the spring terminals 32 will be closed.

The movement of the armature carrier 20 in opposite directions may be limited by adjustable stops or set screws 200, 201.

A relay of the character herein shown is especially useful in connection with main line circuits provided with circuit controllers or breakers, which are provided with an electromagnet for closing the movable member and with a tripping coil for releasing the movable member of the breaker.

A circuit breaker of this character is shown in United States Patent No. 1,210,581 granted to me January 2, 1917.

In Fig. 12 is diagrammatically illustrated a breaker safeguarded by the relay above described against a reverse current and against an abnormal, normal or overload current.

Referring to Fig. 12, 110 represents the movable member of the breaker, and 112, the electromagnet for closing the breaker, which is held in its closed position by a locking lever 113 operated by a toggle 114 which is actuated by a tripping coil 115. The tripping coil 115 is controlled by a circuit controller 116 operated by a solenoid 117, which is included in the auxiliary circuit above described provided with the circuit terminals 40.

This auxiliary circuit when closed, energizes the solenoid 117, which closes the circuit of the tripping coil 115, thereby moving the locking lever 113 to release the movable member 110 of the breaker and permit it to be opened.

The solenoid 117 is also included in the auxiliary circuit provided with the circuit terminals 32, which circuit is closed by the abnormal or overload current flowing in the normal direction.

When such overload current flows in the main circuit and reaches a predetermined value, the second auxiliary circuit is closed as above described, and the tripping coil 115 is operated to permit the main line breaker to be opened.

In Fig. 13, an arrangement is illustrated in which the relay above described as embodying this invention may be used to have the reverse current in the main circuit operate the tripping coil 115 as described with relation to Fig. 12, and to have the normal current operate a solenoid 120 which when energized closes the circuit of the closing coil 112 for the movable member of the breaker.

When the magnetic relay above described is used as represented in Fig. 13, its upper spring 54 will be adjusted, so that the normal position of the armature 18 will be that shown in Figs. 6 and 7, and the contact member 30 will engage the terminal springs 32 and close the auxiliary circuit containing the solenoid 120, which is energized and closes the circuit of the lifting coil 112, which closes the main line breaker.

It will thus be seen that with the arrangement illustrated in Fig. 13, the relay above described responds to a reverse current and operates the tripping coil 115 to open the breaker, and as soon as the reverse current disappears, the spring 53 restores the armature 18 to its normal position with the contact member 30 engaged with the circuit terminals 32 of the auxiliary circuit containing the solenoid 120.

To adjust the relay so as to function as last described, it is only necessary to move the pointer 96 back so as to reduce the tension of the upper spring 54 sufficiently to allow the armature 18 to be moved into the position shown in Figs. 6 and 7, by the poles of the magnetic members $a$, $b$.

From the above description, it will be seen that a relay embodying this invention is capable of being used in inductive relation to a main circuit to permit a current of normal strength to flow in the main circuit in a normal direction without operating the relay; to open the main circuit in response to a reverse current flowing in the opposite direction; and to open the main circuit when an overload or abnormal current flows in the normal direction, or it can be used to open the main circuit in response to a reverse current and to close the main circuit after it has been opened by the reverse current and the latter has been removed from the main circuit.

It will also be observed that the relay is capable of being adjusted by the user to meet his conditions of use.

One construction of relay is herein shown, but it is not desired to limit the invention to the particular construction shown.

What is claimed is:

1. In an apparatus of the character described, a relay provided with a magnetizable member having poles and with an armature co-operating with said poles and movable in opposite directions in response to currents flowing in opposite directions through a circuit in inductive relation to said relay, a carrier for said armature pivoted between its ends, a circuit controlling member affixed to one end of said carrier, terminals for a plurality of auxiliary circuits co-operating with said movable circuit-controlling member to have the latter engage the co-operating circuit terminal of one auxiliary circuit in response to current flowing through said main circuit in one direction, and to have the said movable circuit controlling member engage the circuit terminal of the other auxiliary circuit in response to current flowing through said main circuit in the opposite direction and springs co-operating with the opposite end of said carrier.

2. In an apparatus of the character described, in combination, a relay provided with a magnetizable member having poles and with an armature co-operating with said poles and movable in opposite directions in response to currents flowing in opposite directions through a circuit in inductive relation to said relay, a circuit controlling member movable with said armature, terminals for a plurality of auxiliary circuits co-operating with said movable circuit-controlling member to have the latter engage the co-operating circuit terminal of one auxiliary circuit in response to current flowing through said main circuit in one direction, and to have the said movable circuit controlling member engage the circuit terminal of the other auxiliary circuit in response to current flowing through said main circuit in the opposite direction, means for positioning said armature between said poles and for maintaining it in said position under normal conditions of use, springs co-operating with said positioning means for resisting movement of said armature in opposite directions, and means for adjusting the tension of each spring separately to render the armature responsive to currents of different values flowing in opposite directions in said circuit.

3. In an apparatus of the character described, in combination, a relay provided with a magnetizable member having poles and with an armature co-operating with said poles and movable in opposite directions in response to currents flowing in opposite directions through a circuit in inductive relation to said relay, a pivoted carrier for said armature, a circuit-controlling member affixed to said carrier and extended in opposite directions therefrom, circuit terminals with which said member co-operates, springs for moving said carrier in opposite directions, rods connected with said springs, stationary arms with the opposite surfaces of which said rods are normally engaged by said springs, arms movable with said carrier and co-operating with said rods to move them individually in opposite directions in response to movement of said armature in opposite directions and thereby move the springs individually and independently of each other, and means for adjusting the tension of said springs.

4. In an apparatus of the character described, in combination, a relay provided with a magnetizable member having poles and with an armature co-operating with said poles and movable in opposite directions in response to currents flowing in opposite directions through a circuit in inductive relation to said relay, a pivoted carrier for said armature, a circuit-controlling member affixed to said carrier and extended in opposite directions therefrom, circuit terminals with which said member co-operates, means for positioning said armature between said poles and for maintaining it in said position under normal conditions of use, springs co-operating with said positioning means for moving said carrier in opposite directions, and means for adjusting the tension of said springs, said means including a rotary shaft, a pointer thereon, a dial, and means for connecting the rotary shaft with one of said springs.

5. In an apparatus of the character described, in combination, a relay provided with a magnetizable member having poles and with an armature co-operating with said poles and movable in opposite directions in response to currents flowing in opposite directions through a circuit in inductive relation to said relay, a movable carrier for said armature, a spring to move it in one direction, and means for adjusting the tension of said spring, said means including a rotary shaft, a pointer thereon, a graduated dial with which said pointer co-operates, a longitudinally movable rod to which said spring is connected, and gearing connecting said rod with said rotary shaft.

6. In an apparatus of the character described, in combination, a relay provided with a magnetizable member having poles and with an armature co-operating with said poles and movable in opposite directions in response to currents flowing in opposite directions through a circuit in inductive relation to said relay, springs for moving said carrier in opposite directions, means for connecting said springs with said carrier to enable the carrier when moved in one direction by movement of said armature to act on one of said springs and resist movement of said carrier without acting on the other of said springs.

7. In an apparatus of the character described, in combination, a relay provided with a magnetizable member having poles and with an armature co-operating with said poles and movable in opposite directions in response to currents flowing in opposite directions through a circuit in inductive relation to said relay, a movable carrier for said armature, springs for moving said carrier in opposite directions, means for normally positioning said carrier with its armature in a neutral position between said poles and for permitting the springs to be individually adjusted without disturbing the neutral position of said carrier, a circuit controlling member movable with said carrier, a circuit terminal co-operating with said movable controlling member to be engaged thereby when the said armature is moved in one direction from its neutral position, and a circuit terminal co-operating with the said movable controlling member when said armature is moved in the opposite direction from its neutral position.

8. In an apparatus of the character described, in combination, a relay provided with a magnetizable member having poles and with an armature co-operating with said poles and movable in opposite directions in response to currents flowing in opposite directions through a circuit in inductive relation to said relay, opposing springs co-operating with said armature and means co-operating with said springs for positioning the said armature between said poles when a normal current is flowing in a normal direction through said circuit, and means for adjusting said springs independently without disturbing the neutral position of said armature to cause the armature to be moved in opposite directions in response to currents of different values flowing through the circuit in opposite directions.

9. In an apparatus of the character described, in combination, a relay provided with a magnetizable member having poles and with an armature co-operating with said poles and movable in opposite directions in response to currents flowing in opposite directions through a circuit in inductive relation to said relay, opposing springs co-operating with said armature, means co-operating with said springs for positioning said armature between said poles when a normal current is flowing in a normal direction through said circuit, means for adjusting said springs individually without disturbing the neutral position of said armature to cause the armature to be moved in opposite directions in response to currents of different values flowing through the circuit in opposite directions, a circuit controlling member movable with said armature, and circuit terminals for a plurality of auxiliary circuits, one of which is closed by the movable contact member when the current flowing in one direction reaches a predetermined value, and the other of which is closed by the movable contact member when the current flowing in the opposite direction reaches a predetermined value.

In testimony whereof, I have signed my name to this specification.

JOHAN M. ANDERSEN.